US009411891B2

(12) United States Patent
Li et al.

(10) Patent No.: US 9,411,891 B2
(45) Date of Patent: Aug. 9, 2016

(54) METHODS AND SYSTEMS FOR TEAM SEARCHES IN A SOCIAL NETWORKING SERVICE (71) Applicant: LinkedIn Corporation, Mountain View, CA (US)

(72) Inventors: Lizabeth Li, Mountain View, CA (US); Christian Sutherland-Wong, San Francisco, CA (US)

(73) Assignee: LinkedIn Corporation, Mountain View, CA (US)

( * ) Notice: Subject to any disclaimer, the term of this patent is extended or adjusted under 35 U.S.C. 154(b) by 0 days.

(21) Appl. No.: 13/907,379

(22) Filed: May 31, 2013

(65) Prior Publication Data
US 2014/0358880 A1    Dec. 4, 2014

(51) Int. Cl.
G06F 7/00       (2006.01)
G06F 17/30      (2006.01)

(52) U.S. Cl.
CPC ............................... G06F 17/30864 (2013.01)

(58) Field of Classification Search
None
See application file for complete search history.

(56) References Cited

U.S. PATENT DOCUMENTS

| 8,510,380 | B2 * | 8/2013 | Faller et al. | 709/204 |
| 8,577,748 | B1 * | 11/2013 | Tobin, Jr. | 705/26.4 |
| 2005/0055450 | A1 * | 3/2005 | Gang | G06F 17/30867 709/228 |
| 2007/0005750 | A1 * | 1/2007 | Lunt et al. | 709/223 |
| 2009/0234686 | A1 * | 9/2009 | Chakra et al. | 705/7 |
| 2011/0258316 | A1 * | 10/2011 | Rizk | 709/225 |
| 2012/0023085 | A1 * | 1/2012 | Bellerive et al. | 707/706 |
| 2012/0136852 | A1 * | 5/2012 | Geller | 707/722 |
| 2013/0165234 | A1 * | 6/2013 | Hall | A63F 13/00 463/42 |
| 2013/0174275 | A1 * | 7/2013 | Micucci et al. | 726/28 |
| 2013/0262258 | A1 * | 10/2013 | Jennings | G06Q 30/0631 705/26.4 |
| 2014/0222702 | A1 * | 8/2014 | Jennings | G06Q 50/01 705/319 |

OTHER PUBLICATIONS

Thushar et al., An RDF Approach for Discovering the Relevant Semantic Associations in a Social Network, 2008 16th International Conference on Advanced Computing and Communications, 2008 IEEE.*
Farhadi et al., TeamFinder: A Co-clustering based Framework for Finding an Effective Team of Experts in Social Networks, 2012 IEEE 12th International Conference on Data Mining Workshops, 2012 IEEE.*

* cited by examiner

*Primary Examiner* — Aleksandr Kerzhner
*Assistant Examiner* — Karina Levitian
(74) *Attorney, Agent, or Firm* — Schwegman, Lundberg & Woessner, P.A.

(57) ABSTRACT

Techniques for team searches within a social graph are described. Consistent with some embodiments, a search request initiated by a searching member profile is received. The search request includes search criteria. A team membership connection between the searching member profile and a team profile is then detected. Based on the detected team membership connection, profile connections between member profiles and teammates of the searching member profile are identified. The teammates are member profiles with team membership connections to the team profile. Then, matching member profiles are identified by matching the member profiles with the identified profile connection with the search criteria. The matching member profiles are then communicated to the searching member profile.

18 Claims, 6 Drawing Sheets

METHODS AND SYSTEMS FOR TEAM SEARCHES IN A SOCIAL NETWORKING SERVICE

TECHNICAL FIELD

The present disclosure generally relates to data processing systems. More specifically, the present disclosure relates to methods, systems, and computer program products for performing searches in a social networking service.

BACKGROUND

A social network service may be a computer or web-based service that enables users to establish links or connections with persons for the purpose of sharing information with one another. Some social network services aim to enable friends and family to communicate and share with one another, while others are specifically directed to business users with a goal of facilitating the establishment of professional networks and the sharing of business information. For purposes of the present disclosure, the terms "social network" and "social network service" are used in a broad sense and are meant to encompass services aimed at connecting friends and family (often referred to simply as "social networks"), as well as services that are specifically directed to enabling business people to connect and share business information (also commonly referred to as "social networks" but sometimes referred to as "business networks" or "professional networks").

Many social network services maintain a variety of personal information about their members. For instance, with many social network services, when a user registers to become a member, the member is prompted to provide a variety of personal or biographical information, which may be displayed in a member's personal web page. Such information is commonly referred to as personal profile information, or simply "profile information," and when shown collectively, it is commonly referred to as a member's profile. For instance, with some of the many social network services in use today, the personal information that is commonly requested and displayed as part of a member's profile includes a person's age, birthdate, gender, interests, contact information, residential address, home town and/or state, the name of the person's spouse and/or family members, and so forth. With certain social network services, such as some business or professional network services, a member's personal information may include information commonly included in a professional resume or curriculum vitae, such as information about a person's education, the company at which a person is employed, an industry in which a person is employed, a job title or function, an employment history, skills possessed by a person, professional organizations of which a person is a member, and so on.

Because social networking services can provide a platform for specifying a profile, expressing opinions, and connecting various users, members of the social network service find it useful to utilize services of the social network service to search for and identify other members within the social network service that match a particular search criteria. For example, a recruiter may initiate a search within the social networking service to identify those members that work for a given company, list a given skill or expertise, or the like. In some cases, such searches may result in a large number of matches. To improve searches resulting in a large number of matches, traditional systems may allow the user to narrow the search by identifying further search criteria, such as a geographic location or any other search criteria, and then performing a secondary search on the search results using the newly identified search criteria.

DESCRIPTION OF THE DRAWINGS

Some embodiments are illustrated by way of example and not limitation in the FIGs. of the accompanying drawings, in which.

DETAILED DESCRIPTION

The present disclosure describes methods, systems and computer program products for performing team searches on a social graph of a social networking service. In the following description, for purposes of explanation, numerous specific details are set forth in order to provide a thorough understanding of the various aspects of different embodiments of the present invention. It should be understood that various modifications to the examples may be made. In particular, elements of one example may be combined and used in other examples to form new examples. Many of the examples described herein are provided in the context of a social or business networking website or service. However, the applicability of the inventive subject matter is not limited to a social or business networking service.

A social networking service may be an online service, platform or site that allows members of the service to build or reflect social networks or social relations among the members. Typically, members of the social networking service construct member profiles corresponding to a member, which may include personal information such as the member's name, contact information, employment information, photographs, personal messages, status information, links to web-related content, blogs, and so on. Generally, only a portion of a members profile may be viewed by the general public, and/or other members. In some cases, access rights may control the amount of information that may be viewed by other members. Different access rights may form a privacy policy which may control the information that may be viewed by other members. Such access rights may be dependent on the connections between the viewing member profile and the viewed member profile. For example, if two member profiles are connected (connections are described below) in the social graph then they may have greater access to the information stored in the member profiles of each other.

In order to build or reflect social networks or social relations among members, the social networking service allows members to identify, and establish links or connections with other members. For instance, in the context of a business networking service (a type of social networking service), a person may establish a link or connection with his or her business contacts, including work colleagues, clients, customers, and so on. With a friendship-based networking service, a person may establish links or connections with his or her friends and family. A connection is generally formed using an invitation process in which one member "invites" a second member to form a link. The second member than has the option of accepting or declining the invitation.

Some social networking services may offer a subscription or following model instead of, or in addition to the connection model. A subscription or following model is where one member "follows" another member without mutual agreement. Typically in this model, the follower is notified of public messages and other communications posted by the member that is followed. An example social networking service that follows this model is Twitter, a micro-blogging service which allows members to follow other members without explicit permission.

In general, a connection or link represents, or is otherwise associated with, an information access privilege such that a first person who has established a connection with a second person is, via the establishment of that connection, authorizing the second person to view or access non-publicly available portions of their profiles which may include communications they have authored (e.g., blog posts, messages, "wall" postings, or the like). Of course, depending on the particular implementation of the business/social networking service, the nature and type of the information that may be shared, as well as the granularity with which the access privileges may be defined to protect certain types of data may vary greatly.

In addition to creating a member profile, the social networking service may be configured to define teams. A team, within the context of a social networking service, may be data or logic that organizes a group of members of the social networking service, which may occur for a particular purpose. In some cases, a team may infer certain rights to its members. For example, members of a team may be granted rights to initiate a number of out-of-network messages, view a number of out-of-network profiles, make introductions, and the like. An apt fiction for a team may be a team formed for a recruiting team, a recruiting department, or the like. Other fictions are also possible, such as a sales team, or members looking to network, organizations, or any suitable group of members looking to interact within the social networking service. In an example embodiment, the social networking service may form connections between a member profile and a team profile similar to methods used to form connections or links between members. That is, in some embodiments, a member may request to join a team and an administrator for the team members may elect to accept the request or not. Alternatively or additionally, the administrator may send requests to selected members to join a team, which may then be accepted or not by the members. For clarity of description, the members linked or connected to a team may be referred to as team members.

For clarity of description, connections made between member profiles may be referred to as profile connections, whereas connections between a member profile and a team profile may be referred to as a team membership connection.

Generally, social networking services may be configured to perform member initiated searches on the social graph to identify relevant members, as may be determined by search criteria. For example, the social networking service may provide an interface for a user to enter search criteria (e.g., a job title, company name, experience level, name, education, or any other attribute). Once the search criteria have been entered, the social networking service may then identify those members that match the criteria and then communicate the results to the member that initiated the search. In some cases, the social networking service may identify a degree of connection (e.g., first degree connections, second degree connections, and the like) between the member initiating the search and the members in the search result.

Consistent with some embodiments, a social network service provides members (e.g., people, companies, schools, government entities, non-profits, or any other suitable type of entity) with a computer-implemented service for performing a type of search referred to herein as a team search. In a team search, the social networking service may identify members of the social network service that are connected to team members of a team that the searching member is a part of. For example, according to some embodiments, the social networking service may detect a team membership connection between the searching member and a team. Responsive to detecting the team membership connection, the social networking service may then identify profile connections between the team members and other members of the social networking service. Those members that are connections with the team members are then communicated in the search result to the searching member. An example of a team search is provided by TeamLink®, a product developed by LinkedIn®, headquartered in Mountain View, Calif., United States.

Figure 1:
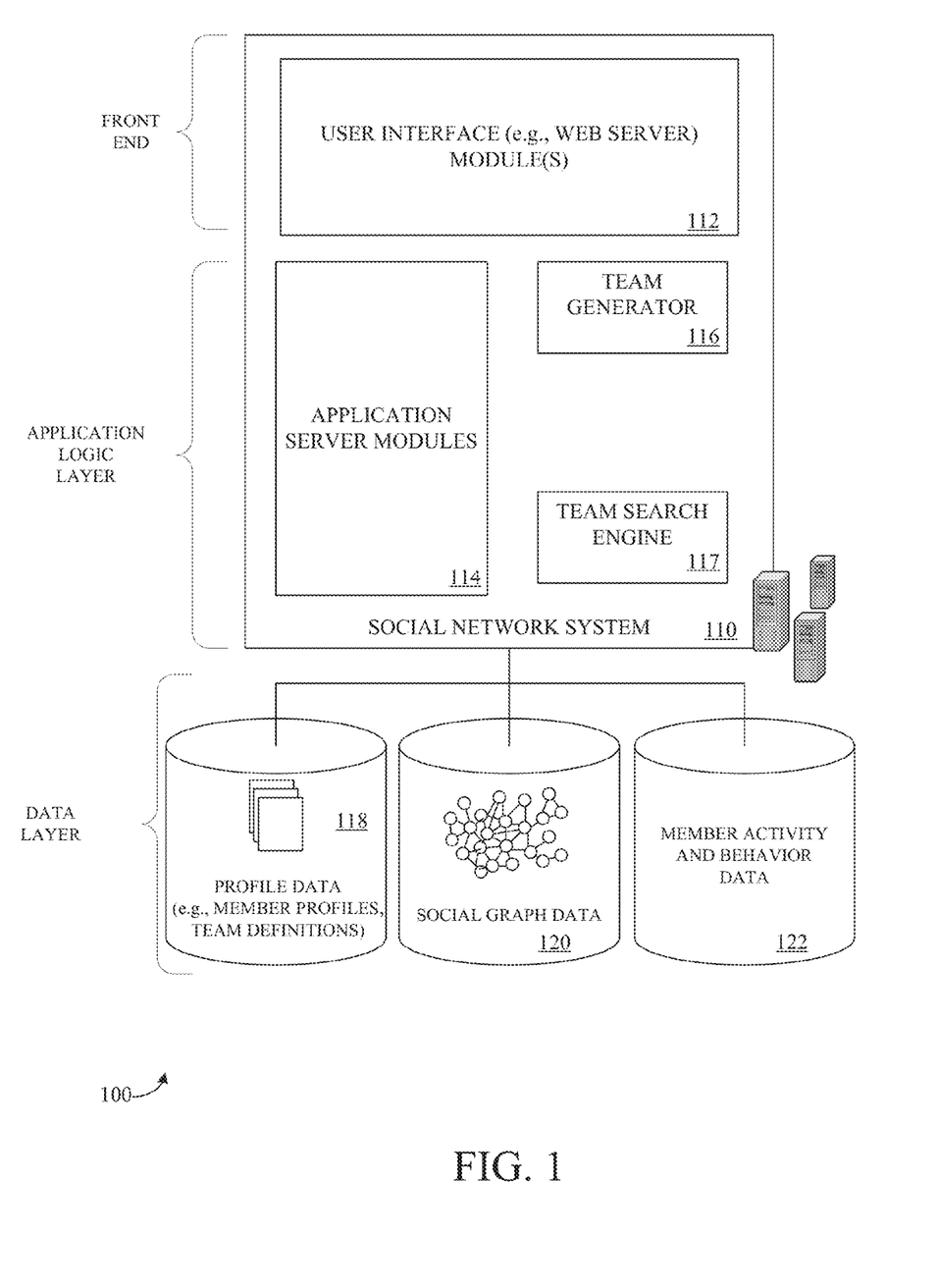
FIG. 1 is a block diagram illustrating various components or functional modules of a social network service, consistent with some embodiments.

FIG. 1 is a block diagram illustrating various components or functional modules of a social network service 100, consistent with some embodiments. As shown in FIG. 1, the front end consists of a user interface module (e.g., a web server) 112, which receives requests from various client-computing devices, and communicates appropriate responses to the requesting client devices. For example, the user interface module(s) 112 may receive requests in the form of Hypertext Transport Protocol (HTTP) requests, or other web-based, application programming interface (API) requests. The application logic layer includes various application server modules 114, which, in conjunction with the user interface module(s) 112, generates various user interfaces (e.g., web pages) with data retrieved from various data sources in the data layer. With some embodiments, individual application server modules 114 are used to implement the functionality associated with various services and features of the social network service. For instance, the ability of performing team searches, including the ability to establish and communicate profile connections of teammates of the searching member, may be services implemented in independent application server modules 114. Similarly, a variety of other applications or services that are made available to members of the social network service will be embodied in their own application server modules 114. For example, with some embodiments, the social network system 110 includes a team generator module 116 and a team search engine 117. The team generator module 116 may be a computer-implemented module configured to enable members of a social network service to establish and manage teams within the social network service. For example, a member, possibly with administration rights, may interact with a web interface provided by the team generator module 116 to define a team within the social network system 110. Defining a team may include specifying attributes values such as a team name, an access control list, password, and the like. In some embodiments, the member may then send invitations to other members to join the team formed through the team generator module 116.

The team search engine 117 may be a computer-implemented module configured to perform team searches based on team membership connections of the searching member. For example, the team search engine 117 may generate search results that indicate that not only does a given member match a search criteria but the given member also has a profile connection with a teammate of the searching member. The operations of the team search engine 117 and the team generator module 116 are described in greater detail below.

As shown in FIG. 1, the data layer includes several databases, such as a database 118 for storing profile data, including member profile data and team profiles. Consistent with some embodiments, when a user initially registers to become a member of the social network service, the person will be prompted to provide some personal information, such as his or her name, age (e.g., birthdate), gender, interests, contact information, home town, address, the names of the member's spouse and/or family members, educational background (e.g., schools, majors, matriculation and/or graduation dates, etc.), employment history, skills, professional organizations, and so on. This information is stored, for example, in the database with reference number 118.

Further, as discussed above, the social network service may allow users (e.g., member or administrators of the social network service) to register or otherwise create team profiles (or just simply "teams") used within the social network service to specify an organization of members within the social network service. The teams may be stored, for example, in the database with reference number 118, or another database (not shown).

Once registered, a member may invite other members, or be invited by other members, to connect via the social network service. A profile connection may require a bi-lateral agreement by the members, such that both members acknowledge the establishment of the profile connection. In addition to profile connections, the team generator module 116 may generate a team membership connection between a member profile and a team profile. As with the profile connection, the team membership connection may require a bi-lateral agreement by the member joining the team and the team administrator, such that both the member and the team administrator acknowledge the establishment of the team membership connection.

The various associations and relationships that the members establish with other members and with other entities, such as teams, are stored and maintained within the social graph, shown in FIG. 1 with reference number 120.

The social network service may provide a broad range of other applications and services that allow members the opportunity to share and receive information, often customized to the interests of the member. For example, with some embodiments, the social network service may include a photo sharing application that allows members to upload and share photos with other members. With some embodiments, the social network service may host various job listings providing details of job openings with various organizations.

As members interact with the various applications, services and content made available via the social network service, the members' behavior (e.g., content viewed, links selected, etc.) may be monitored and information concerning the member's behavior may be stored, for example, as indicated in FIG. 1 by the database with reference number 122. This information may be used to classify the member as being in various categories. For example, if the member performs frequent searches of job listings, thereby exhibiting behavior indicating that the member is a likely job seeker, this information can be used to classify the member as a job seeker. This classification can then be used as a member profile attribute for purposes of enabling others to target the member for receiving messages or status updates. Accordingly, a company that has available job openings can publish a message that is specifically directed to certain members of the social network service who are job seekers, and thus, more likely to be receptive to recruiting efforts.

Figure 2:
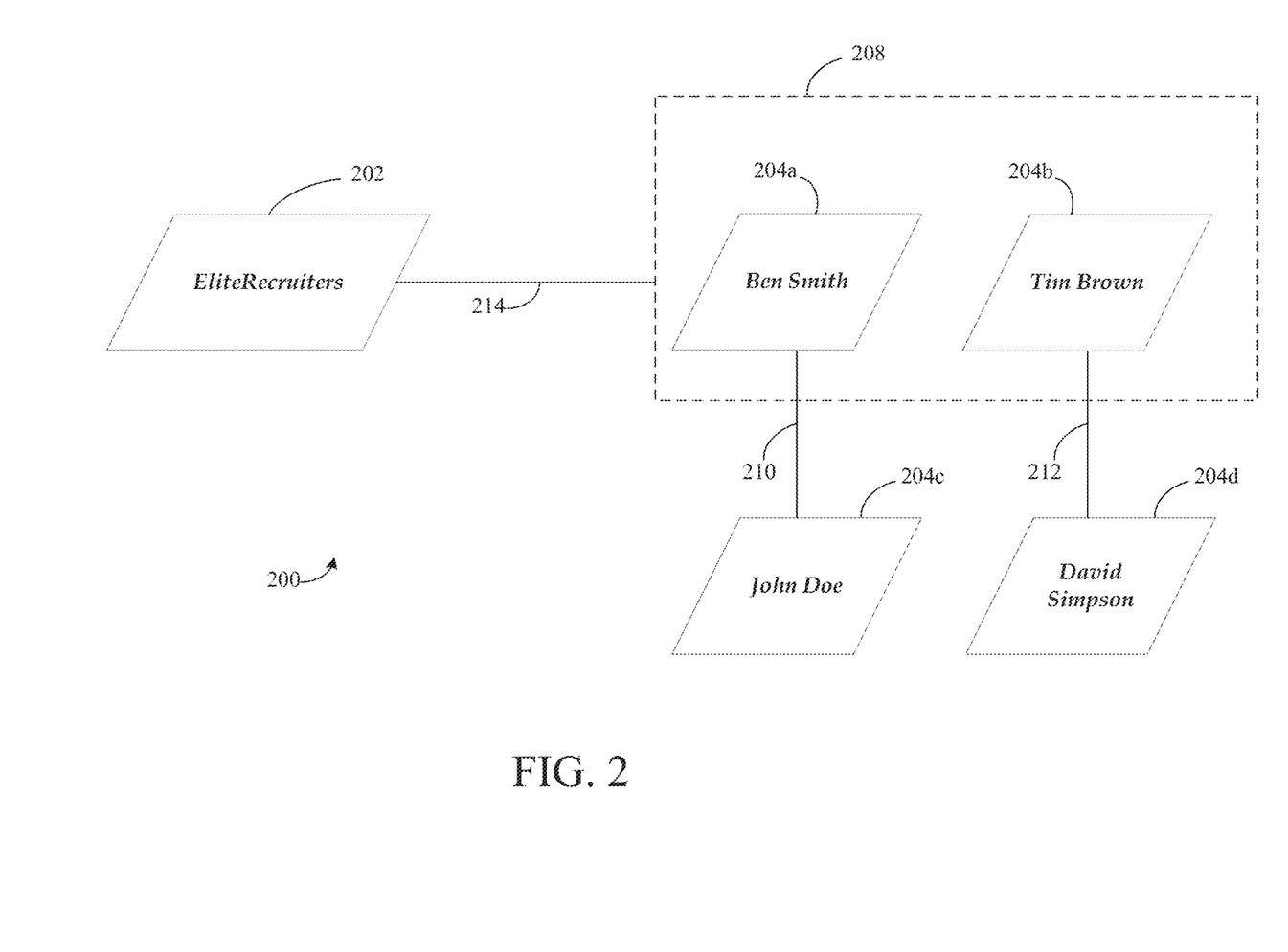
FIG. 2 is a data diagram illustrating a data model utilized by an example embodiment.

FIG. 2 is a data diagram illustrating a data model 200 utilized by an example embodiment. The data model 200 may be conceptual description of the data and relationships stored in databases 118, 120. For example, as illustrated in FIG. 2, the data model 200 may include a team profile 202 and member profiles 204*a-d*. As described above, the team profile 202 may be data or logic representing an organization of members of the social networking service. FIG. 2 shows, by way of example and not limitation, that the team profile 202 represents a team named "EliteRecruiters." In some cases, the team profile 202 may represent an organization of members within another larger organization. To illustrate, employees of a company may define a team profile to represent a real-life program, department, project, committee, or any other suitable group within a company. In this case, the team profile may be a sub-organization of the company. Alternatively or additionally, the team profile 202 may cross multiple organizations. To illustrate, the team profile 202 may represent alumni of a given university, charity, fundraiser, or any similar joint venture. It is to be appreciated that the team profile may be associated with a number of properties or attributes. For example, the team profile 202 may include properties that measure an out-of-message limit, number of sales, number of profile views, number of introductions, or any other suitable property that may be used to measure the activity of the team members that are connected to the team profile 202. In an example embodiment, the social network service may offer team based services for a fee, such as a subscription fee that allows a number of seats for the owner of the team definition to fill.

As discussed above, the member profiles 204*a-d* may be data or logic representing users of the social network service. For example, the member profiles may include attributes specifying a member's name, employment history, educational history, and the like. As discussed above, member profiles may form profile connections with each other. Such profile connection may represent real life social connections between the members and may grant certain access rights to the connected members (e.g., connected members may see "private information listed on the member's profile page). This is shown in FIG. 2 as the profile connection 210 between member profile 204*a* (e.g., Ben Smith) and member profile 204*c* (e.g., John Doe). The member profile 204*b* and the member profile 204*d* may be connected through a profile connection 212.

Also discussed above, in addition to forming profile connections with member profiles, the team generator 116 may form team membership connections between member profiles and team profiles. Such team membership connections may represent that a member profile is a member of a team profile. This is shown in FIG. 2 as the team membership connection 214 between the member profiles 204*a-b*. Because member profiles 204*a-b* are members of the team profile 202, the member profiles 204*a-b* are collectively referred to as the team members 208. Further, member profile 204*a* may be referred to as a teammate of member profile 204*b*, and vice-versa.

The member profiles 204*a-d*, the team profile 202, and the connections (e.g., profile connections 210, 212 and team membership connection 214) may form a social graph, according to example embodiments, as may be stored in the database 120.

It is to be appreciated that the data model 200 shown in FIG. 2 is provided merely for illustration. Some embodiments may use different data models and still be consistent with this disclosure. For example, some embodiments may define team profiles as a property within a member profile, rather than a separate data object. In such embodiments, the social networking service may list a team property by updating the member profile in such a way that the appropriate property is set with a value representing the team, for example.

Figure 3:
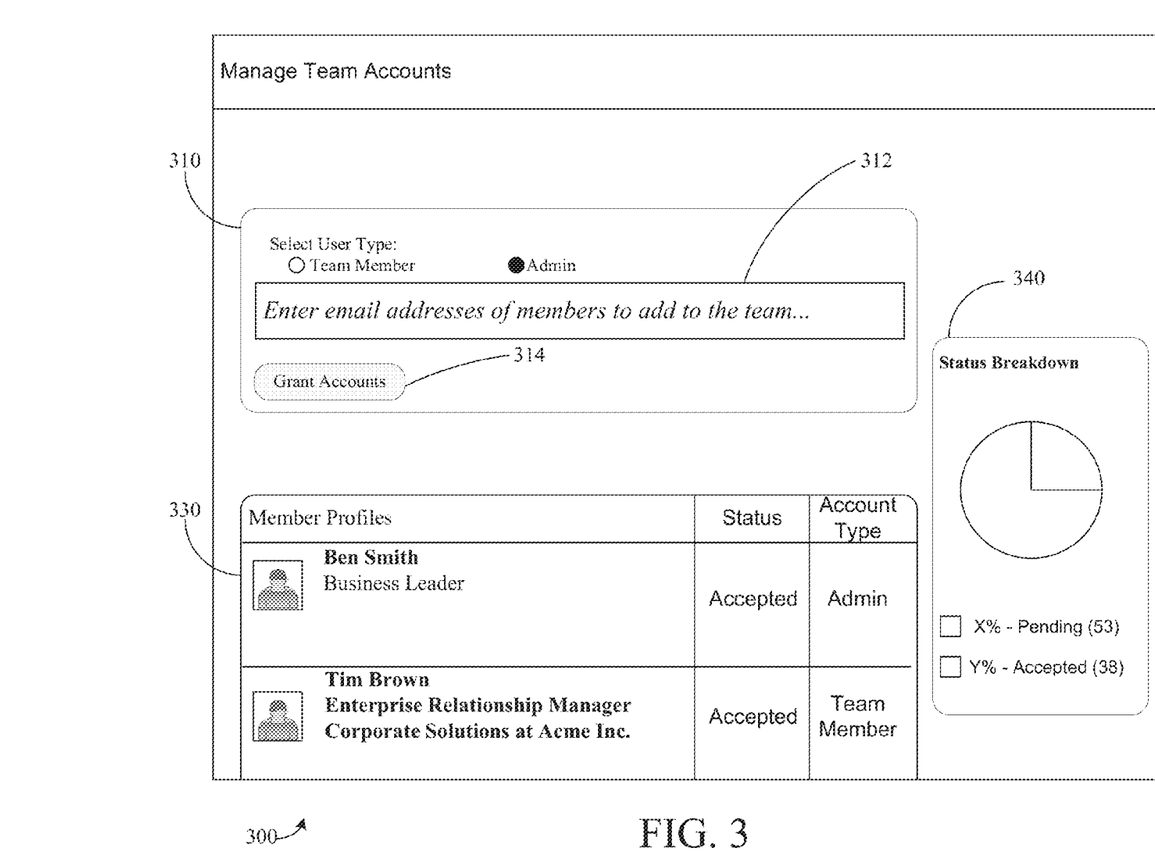
FIG. 3 is a user interface diagram illustrating an example of a user interface or web page for creating and managing team profiles, consistent with some embodiments.

FIG. 3 is a user interface diagram illustrating an example of a user interface 300 or web page for creating and managing team profiles, consistent with some embodiments. In some embodiments, the team generator 116 may have generated the user interface 300 illustrated in FIG. 3 for a particular member utilizing the social network service. In an example use case, Ben Smith may access the user interface 300 to create a team profile and then submit invitations to members of his social graph or the social networking service. For example, FIG. 3 shows that the user interface 300 includes an invitation module 310 and status modules 330 and 340. The invitation module 310 may be a computer-implemented module that provides a user interface for an administrator of a team to specify members of the social network service that may form part of the team. For example, as shown in FIG. 3, the invitation module 310 may provide a member selection element 312 for specifying members of the social network service that are to receive an invitation to join the team. In some embodiments, the member selection element 312 may include data accessed from a contact list belonging to the administrator (e.g., email contact list) and may provide auto-completion functionality when the administrator begins typing the beginning of a contact's name.

In some embodiments, the invitation module 310 may include additional elements for specifying access rights for the member being invited to join the team. For example, access right element 314 may allow the administrator to specify whether the invited members will have administration rights or membership rights. In some cases, administration rights may grant a member rights to modify the properties of the team definition and to establish team membership connections therewith. Some embodiments may specify access rights of different scope (e.g., separate sets of rights for modifying one or more properties and rights to modify the connections associated with the team profile). Once the administrator specifies the members of the social networking service that are to be invited to join the team, the administrator may then activate a grant invitation element 316. Activating the grant invitation element 316 may cause the team generator module 116 to send invitations to the members of the social networking service specified by the member selection element 312.

The status modules 330 and 340 may be computer-implemented modules generated by the team generator module 116 to provide feedback on the status of the invitations to join the team that were sent to members. For example, as shown in FIG. 3, the status module 330 may list one or more member profiles that have been previously invited to join the team, the status of the invitation (e.g., accepted, declined, or pending), and account type (e.g., access rights). The status module 340 may provide a graphical representation of the status of the invitations sent by the administrator through the invitation module 310. For example, the status module 340 may show a visual chart or graph illustrating the number of invitations that have been accepted, pending, or, in some embodiments, declined.

Figure 4:
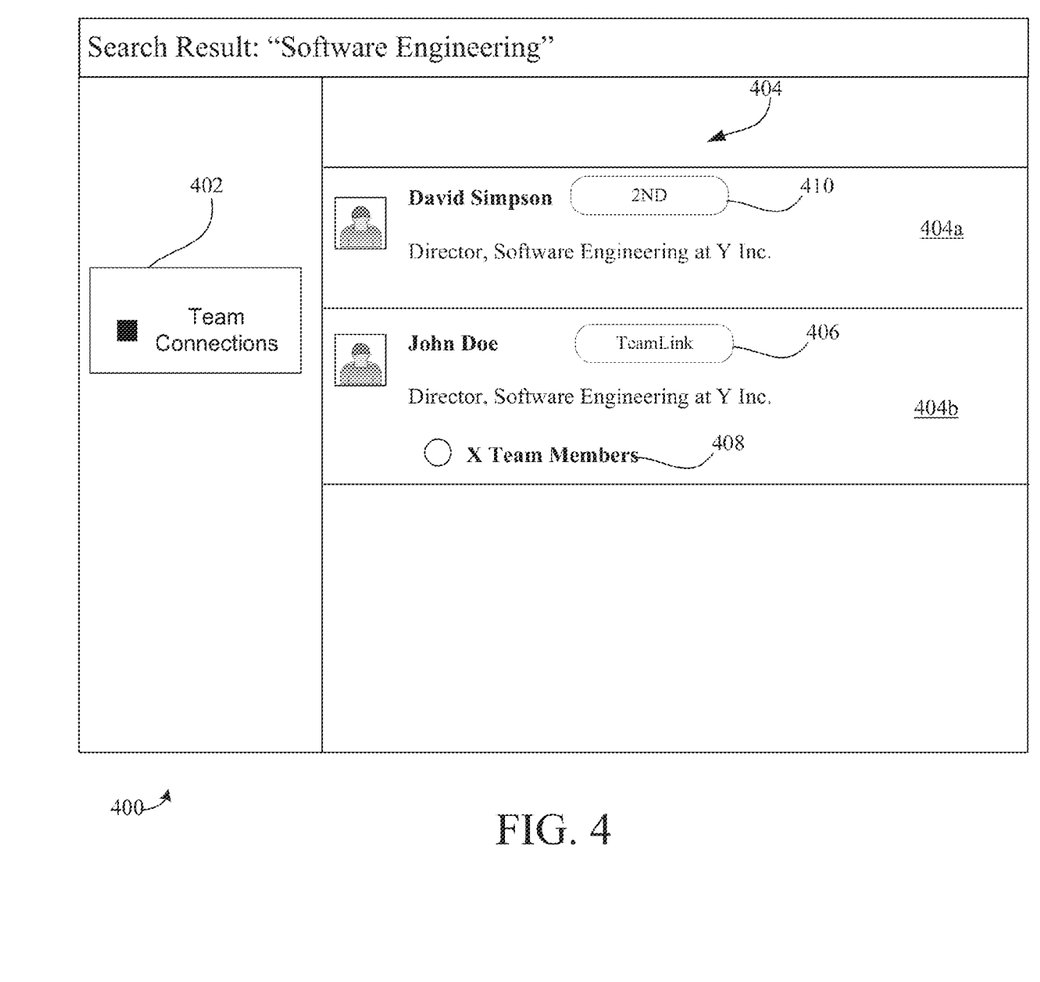
FIG. 4 is a user interface diagram illustrating an example of a user interface or web page for initiating a team search and presenting the team search results, according to an example embodiment.

Once a member has joined a team, the member may initiate a team search on the social graph of the social networking service, as may be performed by the team search engine 117. FIG. 4 is a user interface diagram illustrating an example of a user interface 400 or web page for initiating a team search and presenting the team search results, according to an example embodiment. In some embodiments, the team search engine 117 may have generated the user interface 400 illustrated in FIG. 4 responsive to receiving search criteria entered by a searching member. As an example, the searching member may have specified that the search criteria include the term "Software Engineering."

As FIG. 4 shows, the user interface 400 may include a team search activator 402 and member profiles 404*a-b* displayed in a search result module 404. The team search activator 402 may be a selectable user interface element that, when activated by the searching member, enables a team search that is based on the profile connections of the team members. Accordingly, where the team search activator 402 is disabled, the team search engine 117 may perform a conventional search. On the other hand, where the team search activator 402 is enabled, the team search engine 117 may perform a team search that surfaces profile connections of the teammates of the searching member. In some embodiments, the team search engine 117 may perform a team search in conjunction with conventional searches, such as searches based on profile connections between members and the searching member.

The search result module 404 may be a module generated by the team search engine 117 that displays the results of a query submitted by the searching member. For example, the search result module 404 may display the member profile 404*a* responsive to David Simpson being connected to the searching member and having a property matching the term "Software Engineering." In some cases, the searching member may be connected and the member represented by the member profile 404*a* may be connected by a first degree connection (e.g., the searching members exchanged an invitation to be connected and an acceptance of the invitation). In other cases, the searching member and the member represented by the member profile 404*a* may be connected by an indirect connection. An example of an indirect connection is a second degree connection where David Simpson and the searching member share a first degree connection. Other degrees of connection may also be included, such as third degree connections, fourth degree connections, and so forth. The member profile 404*a* may include a connection degree indicator 410 to indicate the relative degree of connection between the searching member and the member profile 404*a*.

Similar to the member profile 404*a*, the member profile 404*b* may also include a property that matches the search criteria term "Software Engineering." However, rather than being included because of a degree of profile connection (e.g., first degree connection, second degree connection, and so forth), the member profile 404*b* may appear in the search result because the member profile 404*b* may be a profile connection with a member profile that belongs to the same team as the searching member. For example, with momentary reference to FIG. 2, assuming that the member profile 204*b* is the searching member, member profile 204*c* may appear in the search result because the member profile 204*c* has the profile connection 210 with member profile 204*a* and, in turn, the member profile 204*a* is part of the same team as the searching member (e.g., member profile 204b). This is, member profile 204c may be a profile connection of a teammate of the searching member.

With reference back to FIG. 4, a team result indicator 406 may be a user interface element that indicates that the member profile 404b is part of the search result because the member profile 404b is a profile connection with a member of the team. Further, a team connection element 408 may be a user interface element that, responsive to user selection, displays the team members that have profile connections with the member profile 404b. In some embodiments, the team connection element 408 may include additional information, such a count of the number of team members that are connected to the member profile 404b, the references to the team members that are connected to the member profile 404b, and any other suitable data characterizing the connections between the member profile 404b and the team members.

Figure 5:
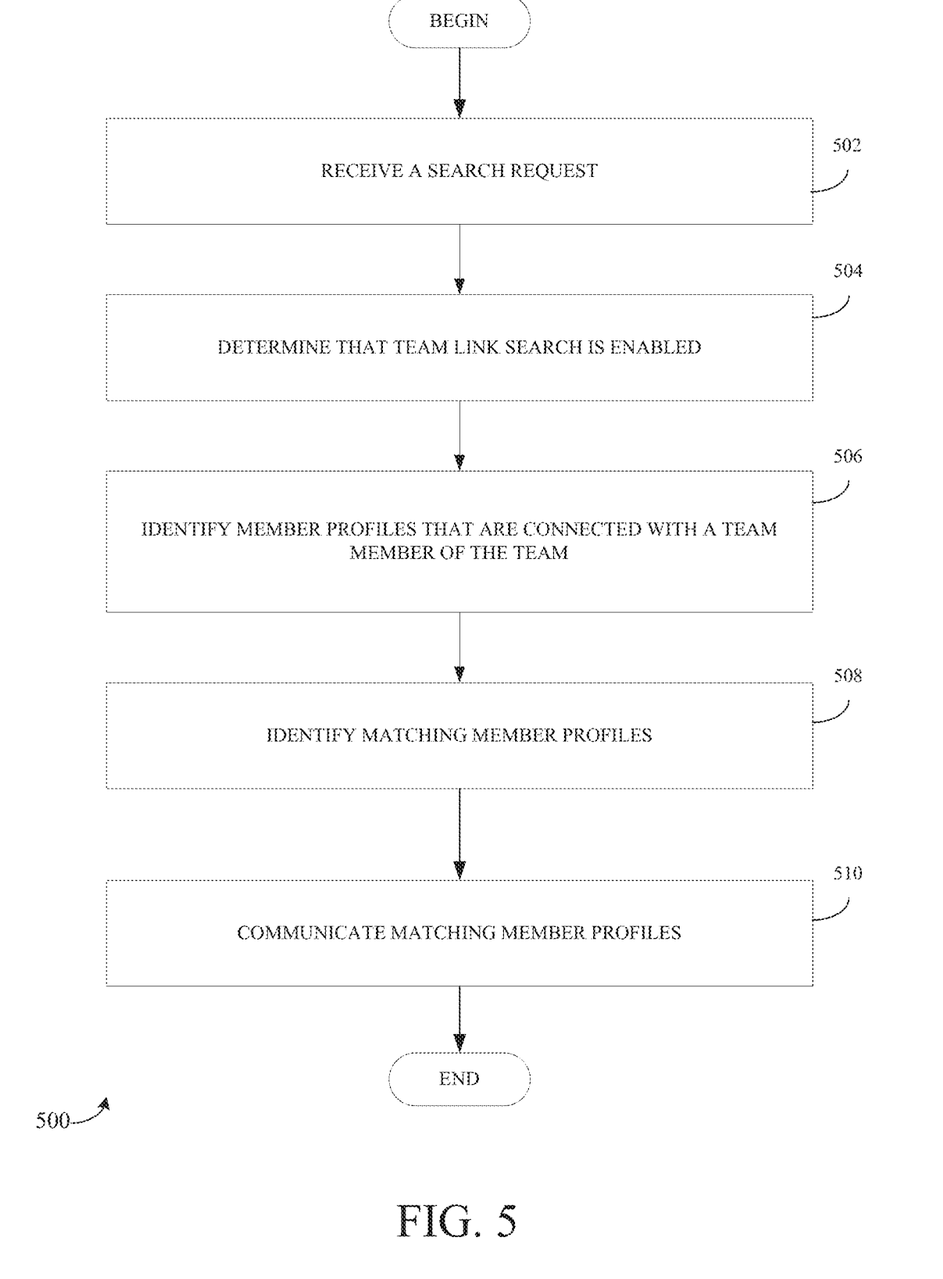
FIG. 5 is a flowchart of a method for performing team searches on a social network service, according to an example embodiment.

FIG. 5 is a flowchart of a method 500 for performing team searches on a social network service, according to an example embodiment. In an example embodiment, the method 500 may be performed by the team search engine 117 of FIG. 1.

The method 500 may begin at operation 502 when the team search engine 117 receives a search request for member profiles in social network service. In an example embodiment, the search request may include search criteria, such as search terms, facets, and the like.

At operation 504, responsive to receiving the search request, the team search engine 117 may determine whether a team search feature is enabled. For example, as previously described above with reference to FIG. 4, a searching member may select the team search activator 402 displayed on a search interface. Activating the team search activator 402 may provide a signal to the team search engine 117 that the searching member would like the team search engine 117 to identify profile connections of teammates of the searching member.

At operation 506, the team search engine 117 may then identify member profiles that are connected with a teammate of the searching member. For example, in some embodiments, the team search engine 117 may identify a team membership connection between the searching member and a team profile and, in turn, the team members for that team. Then, for each team member identified, the team search engine 117 may identify the member profiles that are connected to those team members by profile connections, which may conceptually define the search space of member profiles. As described above, a team may be formed based on an administrator creating a team profile, sending invitations to members of a social network service, and receiving acceptance of those invites. When a member accepts the invite, the team generator 116 may create a team membership connection between the team profile and the member profile, which may be represented by data structures in the social graph data (e.g., see social graph data 120 shown in FIG. 1).

In some embodiments, the team search engine 117 may limit the member profiles identified at operation 506 based on a degree threshold. A "degree threshold," as used herein, may specify a level of degree of a connection between member profiles before being identified as a member profile that is connected to the team. For example, one embodiment of the team search engine 117 may limit connections of the team to be first degree connections of team members, while another embodiment of the team search engine 117 may limit connections of the team to be second or any other indirection connection of the team members. A degree threshold may be a configuration parameter of the team search engine 117.

Continuing with FIG. 5, at operation 508, the team search engine 117 may identify the member profiles that match the search criteria specified by the search request. For example and not limitation, the team search engine 117 may identify the member profiles that include the search term "Software Engineering." In other embodiments, the team search engine 117 may also match the member profiles based on facets specified by the search request, such as by a company name, location, job title, degree of connection, group participation, and the like.

At operation 510, the team search engine 117 may communicate the search results to the searching member. For example, the team search engine 117 may generate search results displayable in the user interface 400 of FIG. 4. In some cases, the team search engine 117 may provide the searching member access rights to the member profiles communicated in the search results as if the searching member is a profile connection. For example, the searching member may be given access to view information from the member profile in the search result that is granted to first degree connections. Other access rights may allow the member profile to send a message to the member profile in the search result.

It is to be appreciated that the embodiments disclosed above may be practiced in alternative embodiments without departing from the embodiments contemplated by this disclosure. For example, although the team search engine 117 of FIG. 1 was described as limiting the member profiles identified as being connected to a team based on a connection threshold, other embodiments may generate connections of a team on a periodic or scheduled basis. For example, where a member profile is connected to a team profile, the team generator 116 may include first degree (or any other degree) connections of the accepting member to the connections of the team. Thereafter, the team generator 116 may execute a scheduled, possibly periodic, process that iterates over the profile connections of the team members to determine if the team members established any new profile connections since they first joined the team. If so, the team generator 116 may create a new relationship between the new profile connections and the team profile. Such scheduled processing may improve the processing time used to perform searches of team connections because the connections of the team are pre-computed.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules or objects that operate to perform one or more operations or functions. The modules and objects referred to herein may, in some example embodiments, comprise processor-implemented modules and/or objects.

Similarly, the methods described herein may be at least partially processor-implemented. For example, at least some of the operations of a method may be performed by one or more processors or processor-implemented modules. The performance of certain operations may be distributed among the one or more processors, not only residing within a single machine or computer, but deployed across a number of machines or computers. In some example embodiments, the processor or processors may be located in a single location (e.g., within a home environment, an office environment or at a server farm), while in other embodiments the processors may be distributed across a number of locations.

The one or more processors may also operate to support performance of the relevant operations in a "cloud computing" environment or within the context of "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs)).

Figure 6:
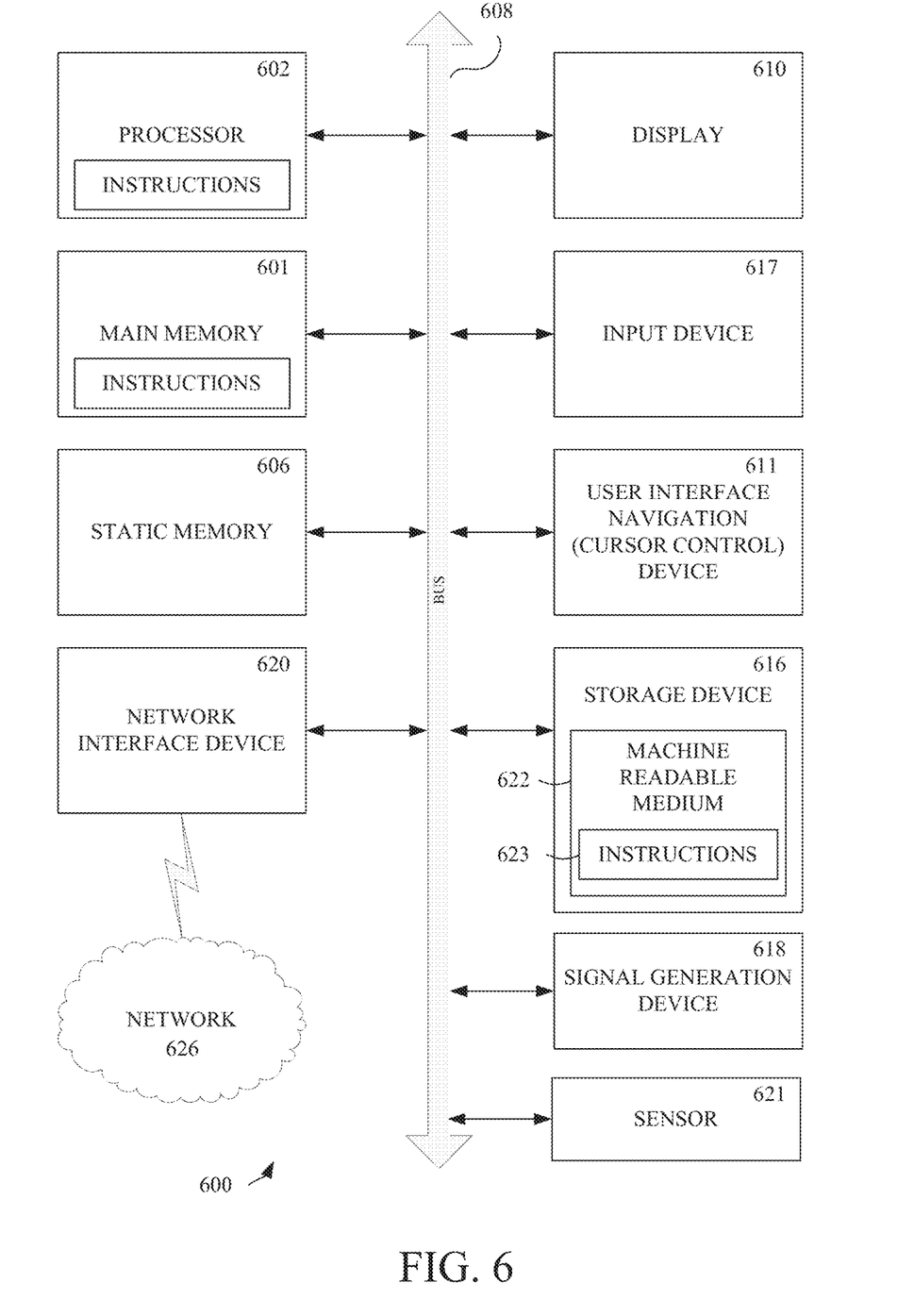
FIG. 6 is a block diagram of a machine in the form of a computing device within which a set of instructions, for causing the machine to perform any one or more of the methodologies discussed herein, may be executed.

FIG. 6 is a block diagram of a machine in the form of a computer system within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a client-server network environment, or as a peer machine in peer-to-peer (or distributed) network environment. In a preferred embodiment, the machine will be a server computer, however, in alternative embodiments, the machine may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU) or both), a main memory 601 and a static memory 606, which communicate with each other via a bus 608. The computer system 600 may further include a display unit 610, an alphanumeric input device 617 (e.g., a keyboard), and a user interface (UI) navigation device 611 (e.g., a mouse). In one embodiment, the display, input device and cursor control device are a touch screen display. The computer system 600 may additionally include a storage device 616 (e.g., drive unit), a signal generation device 618 (e.g., a speaker), a network interface device 620, and one or more sensors 621, such as a global positioning system sensor, compass, accelerometer, or other sensor.

The drive unit 616 includes a machine-readable medium 622 on which is stored one or more sets of instructions and data structures (e.g., software 623) embodying or utilized by any one or more of the methodologies or functions described herein. The software 623 may also reside, completely or at least partially, within the main memory 601 and/or within the processor 602 during execution thereof by the computer system 600, the main memory 601 and the processor 602 also constituting machine-readable media.

While the machine-readable medium 622 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The software 623 may further be transmitted or received over a communications network 626 using a transmission medium via the network interface device 620 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A computer-implemented method comprising:
   receiving a search request being initiated by a searching member profile, the search request including search criteria;
   detecting, in one or more databases, a team membership connection between the searching member profile and a team profile, the team profile defining a plurality of members having an affiliation with an organization, wherein the organization is the same for each member of the plurality of members;
   based on the detected team membership connection, identifying, by one or more processors, profile connections between member profiles and teammates of the searching member profile, the teammates being member profiles with team membership connections to the team profile,
   wherein:
   at least one team membership connection was approved for connecting a corresponding member profile with the team profile by an administrator of the team profile;
   identifying matching member profiles by matching the member profiles with the identified profile connection with the search criteria, wherein at least one matching member profile comprises an indirect profile connection between the at least one matching member profile and the searching member profile;
   communicating the matching member profiles with the identified profile connections to the searching member profile; and based on the identified profile connections between the teammates of the searching member profile and the matching member profiles, granting the searching member profile access rights to the matching member profiles that correspond to access rights the teammates are granted to the matching member profiles, wherein the access rights granted to the searching member profile are access rights granted to member profiles connected through a first-degree connection.

2. The method of claim 1, wherein the team profile includes messaging limits shared by the searching member profile and the teammates.

3. The method of claim 1, wherein identifying the profile connections between the member profiles and the teammates includes limiting the profile connections to first degree connections.

4. The method of claim 1, wherein communicating the matching member profiles comprising generating a visual indicator for each of the matching member profiles, the visual indicator designating the communicated member profiles as profile connections of the teammates of the searching member profile.

5. The method of claim 1, further comprising:
communicating additional member profiles that match the search criteria, the additional member profiles lacking team membership connections to the team profile; and
generating a visual indicator to be displayed with the additional member profiles, the additional indicator being a different visual image than the visual indicators associated with the matching member profiles.

6. The method of claim 1, further comprising, prior to receiving the search request:
generating a user interface that includes a member selection element configured to obtain a user specified member of the social networking service; and
responsive to detecting a user initiated submission of the user specified member, sending an invitation to join the team profile to a member account corresponding to the user specified member.

7. The method of claim 6, further comprising, responsive to detecting an acceptance of the invitation to join the team profile, generating a team membership connection between the team profile and the member profile corresponding to the user specified member.

8. The method of claim 7, further comprising updating a status of the invitation to indicate that the user specified member joined the team profile.

9. The method of claim 7, further comprising:
identifying additional member profiles connected to the member profile of the user specified member through profile connections; and
generating team connections between the additional member profiles and the team profile.

10. A computer system comprising:
A non-transitory, computer-readable medium having instructions stored thereon, which, when executed by at least one processor, cause the computer system to:
receive a search request being initiated by a searching member profile, the search request including search criteria;
detect, in one or more databases, a team membership connection between the searching member profile and a team profile, the team profile defining a plurality of members having an affiliation with an organization, wherein the organization is the same for each member of the plurality of members;
based on the detected team membership connection, identify profile connections between member profiles and teammates of the searching member profile, the teammates being member profiles with team membership connections to the team profile, wherein at least one team membership connection was approved for connecting a corresponding member profile with the team profile by an administrator of the team profile;
identify matching member profiles by matching the member profiles with the identified profile connection with the search criteria, wherein at least one matching member profile comprises an indirect profile connection between the at least one matching member profile and the searching member profile;
communicate the matching member profiles with the identified profile connections to the searching member profile; and
based on the identified profile connections between the teammates of the searching member profile and the matching member profiles, grant the searching member profile access rights to the matching member profiles that correspond to access rights the teammates are granted to the matching member profiles, wherein the access rights granted to the searching member profile are access rights granted to member profiles connected through a first-degree connection.

11. The computer system of claim 10, wherein the team profile includes messaging limits shared by the searching member profile and the teammates.

12. The computer system of claim 10, wherein the computer system is further configured to identify the profile connections between the member profiles and the teammates by limiting the profile connections to first degree connections.

13. The computer system of claim 10, wherein the computer system is further configured to communicate the matching member profiles by generating a visual indicator for each of the matching member profiles, the visual indicator designating the communicated member profiles as profile connections of the teammates of the searching member profile.

14. The computer system of claim 10, wherein the computer system is further configured to:
communicate additional member profiles that match the search criteria, the additional member profiles lacking team membership connections to the team profile; and
generate a visual indicator to be displayed with the additional member profiles, the additional indicator being a different visual image than the visual indicators associated with the matching member profiles.

15. The computer system of claim 10, further comprising a team generator module implemented by the at least one processors t and configured to, prior to receiving the search request:
generate a user interface that includes a member selection element configured to obtain a user specified member of the social networking service; and
responsive to detecting a user initiated submission of the user specified member, send an invitation to join the team profile to a member account corresponding to the user specified member.

16. The computer system of claim 15, wherein the team generator module is further configured to, responsive to detecting an acceptance of the invitation to join the team profile, generate a team membership connection between the team profile and the member profile corresponding to the user specified member.

17. The computer system of claim 16, wherein the team generator module is further configured to update a status of the invitation to indicate that the user specified member joined the team profile.

18. A non-transitory computer-readable medium storing executable instructions thereon, which, when executed by a processor, cause the processor to perform operations including:

- receiving a search request being initiated by a searching member profile, the search request including search criteria;
- detecting, in one or more databases, a team membership connection between the searching member profile and a team profile, the team profile defining a plurality of members having an affiliation with an organization, wherein the organization is the same for each member defined by the team profile;
- based on the detected team membership connection, identifying profile connections between member profiles and teammates of the searching member profile, the teammates being member profiles with team membership connections to the team profile, wherein at least one team membership connection was approved for connecting a corresponding member profile with the team profile by an administrator of the team profile;
- identifying matching member profiles by matching the member profiles with the identified profile connection with the search criteria, wherein at least one matching member profile comprises an indirect profile connection between the at least one matching member profile and the searching member profile;
- communicating the matching member profiles with the identified profile connections to the searching member profile; and
- based on the identified profile connections between the teammates of the searching member profile and the matching member profiles, granting the searching member profile access rights to the matching member profiles that correspond to access rights the teammates are granted to the matching member profiles, wherein the access rights granted to the searching member profile are access rights granted to member profiles connected through a first-degree connection.

* * * * *